United States Patent

[11] 3,600,828

[72] Inventor Leland G. Hodges
 Denver, Colo.
[21] Appl. No. 849,983
[22] Filed Aug. 14, 1969
[45] Patented Aug. 24, 1971
[73] Assignees Leland G. Hodges
 Denver, ;
 Arthur R. Wallace
 Littleton; Jerald E. Watson, Wheat Ridge, Colo.

[54] TESTING APPARATUS FOR EXAMINATIONS
 7 Claims, 7 Drawing Figs.
[52] U.S. Cl. .................................................. 35/48 R
[51] Int. Cl. ....................................................... G09b 7/00
[50] Field of Search ...........................................35/48, 48 B, 9; 235/61.6

[56] References Cited
UNITED STATES PATENTS

| | | | |
|---|---|---|---|
| 2,275,590 | 3/1942 | Johnson | 35/48 B X |
| 2,738,595 | 3/1956 | John et al. | 35/48 R |
| 3,190,014 | 6/1965 | Rhodes | 35/9 R X |

*Primary Examiner*—Wm. H. Grieb
*Attorney*—Van Valkenburgh and Lowe

ABSTRACT: An apparatus for recording correct answers to a multiple choice-answer examination wherein a punch card coding correct answers is used in the apparatus at a control panel. The test is taken at a remote panel with answers being effected by closing circuits through selected switches which are either closed at the punch card or open depending upon whether the answer is correct or incorrect.

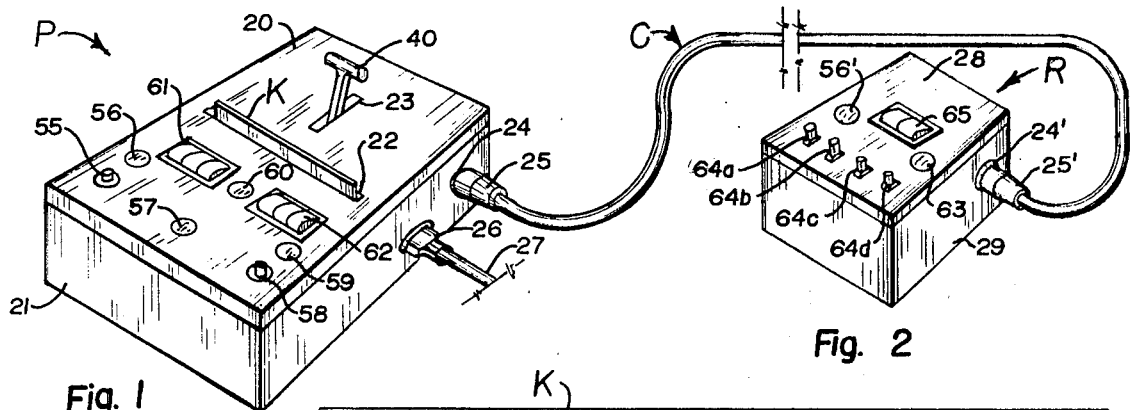
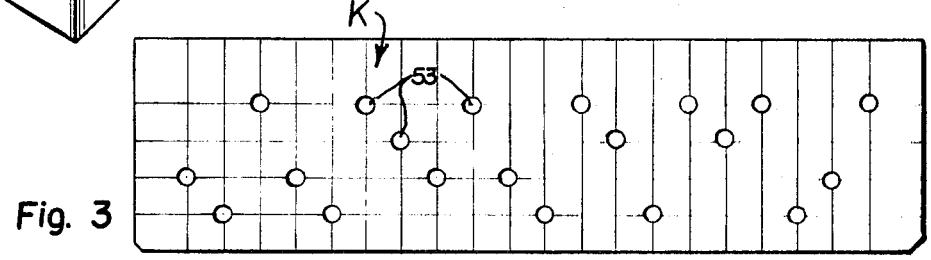
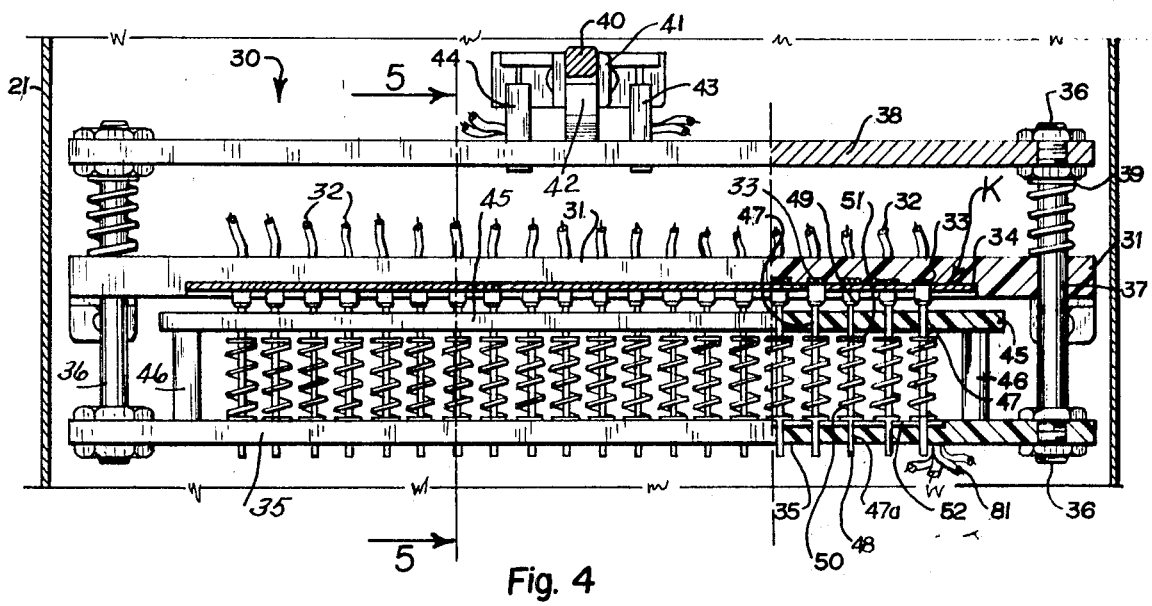
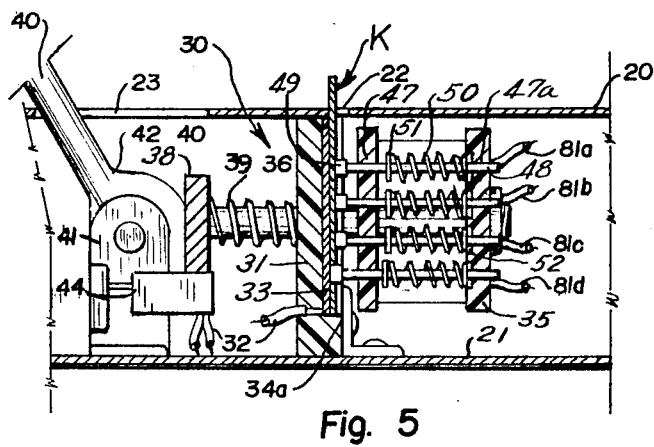
INVENTOR.
Leland G. Hodges

INVENTOR.
Leland. G. Hodges
BY Van Valkenburgh & Lowe
ATTORNEYS

TESTING APPARATUS FOR EXAMINATIONS

This invention relates to classroom testing apparatus, and more particularly to testing apparatus for examinations of the multiple choice-answer type. As such, the invention will be hereinafter referred to as testing apparatus for multiple choice-answer examinations, and sometimes simply as testing apparatus.

The multiple choice-answer examination, for which the apparatus embodied in the present invention is intended, involves a question or a proposition followed by several statements or proposed answers, one of which is correct. Examinations of this type are used extensively. They will usually consist of 10, 20 or even 100 or more of such questions and multiple choice answers. The evaluation of such an examination simply consists of ascertaining the ratio of correct answers to the total number of questions propounded and for this reason, it has become a popular type of examination, easy to correct and evaluate.

Apparatus has been proposed to accelerate multiple choice-answer examinations to ease the burden of the classroom teacher or monitor giving the examination. However, several disadvantages in using such proposed apparatus have become apparent. There is the problem of mixing up question numbers so the student is answering the wrong question. There is the tendency of some students to cheat if they can manipulate the apparatus, and there is the problem of quickly resetting the apparatus for different examinations.

Also, such apparatus which has been proposed for multiple choice-answer examinations is quite bulky and expensive and requires experts for its operation and maintenance. Clearly, such apparatus cannot be used in an ordinary classroom or similar facility of a limited budget. There is a need for a low cost, simple apparatus which may be used by anyone.

The present invention was conceived and developed with such need in view, and the invention comprises, in essence, a testing apparatus consisting of a control panel to be operated by a teacher or monitor and a remote panel to be operated by a student taking an examination. The panels, which may be formed within portable containers, or integrated into the desks or furniture of a room, are operatively interconnected by a multiwire cable so a student may appropriately designate his choice of an answer to a question at the remote panel, with the electrical signal being extended to the control panel where it is determined whether his answer is correct or incorrect, where the result is tallied and where the apparatus is shifted to permit the student to answer the next question of the examination.

An object of the invention is to provide a novel and improved testing apparatus, and method of testing, for a multiple choice-answer examination which permits a student to take an examination as fast as he is able to analyze each question and arrive at his conclusion as to the correct answer, and which permits the teacher or monitor giving the examination to immediately know the results of the examination.

Another object of the invention is to provide a novel and improved testing apparatus which includes a correlated operation of the control panel and indicator panel to indicate to a student at the remote panel precisely the question number he should be answering to minimize the possibility of a mixup of questions.

Another object of the invention is to provide a novel and improved testing apparatus which is capable of performing the several necessary functions of tallying the questions, answers, indicating the end of a test and such as are required to assist in the controlling and analyzing of an examination by a teacher or monitor.

Another object of the invention is to provide a novel and improved testing apparatus which cannot be operated in such a manner as to permit a student to cheat by manipulating the apparatus.

Another object of the invention is to provide a novel and improved testing apparatus which is easily modified for a number of different examinations through a simple punch card coding system.

Other objects of the invention are to provide a novel and improved testing apparatus which is simple, neat appearing, reliable, rugged and durable, which is adapted to be operated by a standard commonly available 110-volt A.C. power source, and which is a low cost unit especially suitable for installations where economy of installation is important.

With the foregoing and other objects in view, all of which more fully hereinafter appear, my invention consists of certain constructions and arrangements of parts and elements and of steps and sequences as hereinafter described, defined in the appended claims and illustrated in the accompanying drawing in which:

FIG. 1 is a perspective view of one embodiment of the monitor's control panel of the testing apparatus.

FIG. 2 is a perspective view, associated with FIG. 1 by cable connection, of one embodiment of the student's remote panel of the apparatus.

FIG. 3 is a plan view of the face of a coded punch card to be used in the control panel of the apparatus for a specific examination.

FIG. 4 is a fragmentary plan view of a portion of the control panel, but with the top cover of the case removed to show the punch card holding apparatus therewithin, with portions of this apparatus also being in section to show parts otherwise hidden from view.

FIG. 5 is a sectional view, as taken from the indicated line 5—5 at FIG. 4, but with the top cover of the case being in place.

Figure 6:
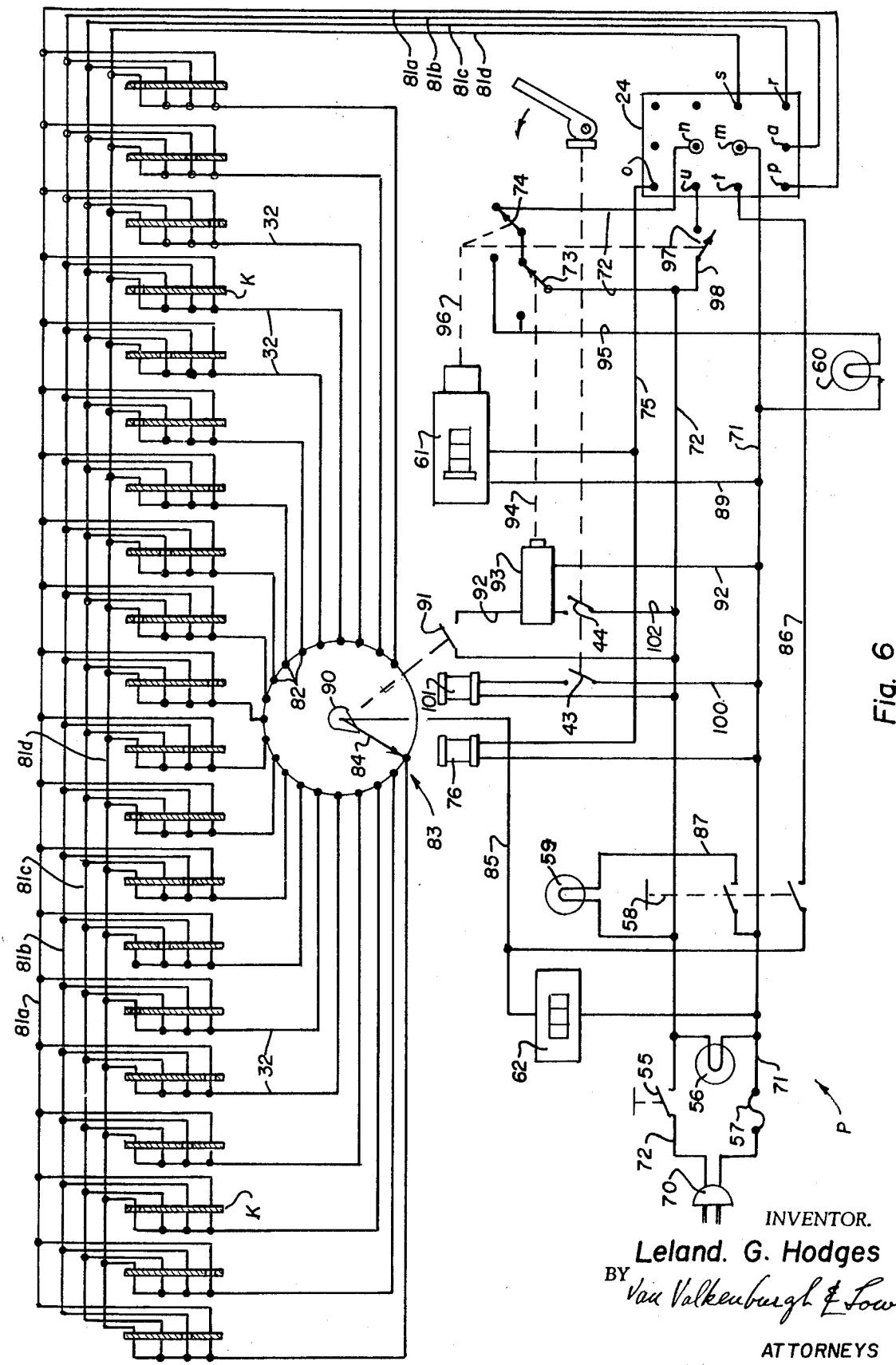
FIG. 6 is a circuit diagram of the circuits and components within the control panel of FIG. 1.

Referring more particularly to the drawing, the improved testing apparatus consists of a control panel P, FIG. 1, a remote panel R, FIG. 2, and a cable C which interconnects the two panels. The control panel P is formed with a cover 20 enclosing a boxlike container 21, made of sheet metal or any other suitable material. The cover 20 includes a card slot 22, a handle slot 23 and various other openings for switches, lights and counters as hereinafter described. The container 21 includes a socket 24 for receiving a plug end 25 of the cable C. The container 21 also includes a socket 26 for the plug of a power supply cord 27 such as that which may be connected to a standard 110-volt source. The sockets and plugs are illustrated as being located at the side of a container, but it is understood that they may be located at any other suitable position such as at the rear of the container.

The remote panel R is formed with a cover 28 enclosing a boxlike container 29. The cover 28 includes openings for switches and indicators as hereinafter described. The container 29 includes a socket 24' for receiving a plug end 25' of the cable C. The socket 24' may be at any suitable position on a wall of the container as heretofore noted.

In the apparatus herein described, the components may be designed for accommodating examinations having a reasonable number of questions and with each question having a reasonable number of possible answers, one of which is correct. As a practical matter, however, it was found that an apparatus built to accommodate an examination having 20 questions with each question having four possible answers would satisfy most classroom needs. Regardless of the number of questions and possible answers for each question, the specific apparatus, the manner of taking an examination and the function of the apparatus will be essentially the same. On taking an examination, a student will answer specific questions by selection of answer switches at the remote panel R and a sequence of electrical pulses representing the selected answers to the questions will be provided to the control panel P through circuit leads in cable C. This information, the selected sequence of pulses, is directed to a sequential discriminator 30 in the control panel where the electrical pulses, representing answers to questions, are properly counted, or not counted, as hereinafter described.

The sequential discriminator 30, illustrated as providing circuits for 20 questions with four possible answers to each question, is mounted within and extends across the container 21 of the control panel P. It includes an upstanding base plate 31 which is attached to the bottom of the container 21 in any suitable manner. A sequence of 20 leads 32 extend into the rearward side of this plate and connect with a spaced array of 20 upstanding bus bars 33 embedded in or printed upon the opposite, forward side of this plate, the array extending across the major portion of the plate. Each end of the front side of this plate, beyond the bus bars, is formed with a suitable offset 34 and the lower edge portion of the plate includes a corresponding base offset 34a. These offsets 34 and 34a provide edge guides for holding a code card K, in position against the front face of the plate as illustrated at FIGS. 4 and 5. Accordingly, this base plate 31 is necessarily located directly below the card slot 22 so a code card K may be dropped into position against the offsets adjacent to the sides and bottom of the base plate 31. An array of 80 contacts is associated with the bus bars 33 as hereinafter described, and these contacts are mounted upon a carrier which includes a plate 35 having a length comparable to the base plate 31. This carrier plate 35 is shiftably mounted upon the base plate, to lie in spaced parallelism thereto and to move towards and away from the base plate to close contacts with the bus bars 33 through holes in the card K and to move away from the bus bars to release the card as will be described. A rod 36 outstands from each end of the carrier plate surface to extend through a guide hole 37 in the end of the base plate with the extended end thereof connecting with a yoke bar 38 which lies in spaced parallelism with the base plate surface. A compression spring 39 is mounted upon each rod between the base plate and yoke bar to resiliently urge the yoke bar rearwardly away from the base plate and thereby urge the carrier plate towards the base plate.

A hand lever 40 is pivotally mounted upon a bracket 41 upstanding from the bottom of the container with the arm of the lever extending upwardly through the handle slot 23. This hand lever 40 includes a cammed surface 42 at its base which acts against the rearward face of the yoke bar 38 to urge it forwardly against the pressure of springs 39. Whenever the hand lever is pulled forwardly for a card release action, hereinafter described, two microswitches 43 and 44, mounted upon the bracket 41 and associated with this lever, are actuated to close circuits as hereinafter described. A support plate 45 is affixed to the carrier plate 35 by studs 46 to lie between the carrier plate 35 and the base plate 31 in spaced parallelism therewith and is spaced moderately close to the base plate surface. Eighty holes 47, in an array of 20 columns and four rows, are provided in the carrier plate 45 and a like aligned array of holes 47a is provided in the support plate 35. A plunger rod 48, having an electrical contact head 49, slidably extends through each corresponding pair of holes 47 and 47a' in the carrier plate 35 and support plate 45 with the head 49 being adjacent to and contacting a bus bar 33. Accordingly, four such rods 48 contact each bus bar 33 and represent the four possible answers to a question. A spring 50 about each rod between the plates 35 and 45 has one end abutted against a lug 51 on the rod and the other end abutted against an elongated bus bar 52 which is mounted or printed upon the rear surface of the plate 35. Each spring 50 urges its rod 48 towards contact with the upright bus bars 33 when the carrier plate 35 is pulled towards the base plate 31 by springs 39, and whether or not contact is made depends upon the arrangement of holes in a card K which is in position against the base 31.

The code card K, of a heavy paper or cardboard, when fitted in the socket provided for it by edges 34 and 34a of the base plate 31, shields the upright bus bars 33 from contact with the heads 49. This interrupts any possible circuit between the elongated horizontal bus bars 52 and the vertical bus bars 33. The card K is arranged with a sequence of 20 holes 53 positioned across the card, one for each bus bar 33, with each hole being located in registration with one of the four contact heads 49 of each column. The positioning of a hole 53 will thus provide a specific contact for each bus bar 33 with only one of the four bus bars 52, and this contact will provide a circuit to indicate a correct answer when the apparatus is in use as will be explained. It is apparent that various combinations of holes may be punched in a card and a monitor operating a series of tests may have a group of cards, having varying groups of holes, indicated by code, for various examinations.

The controls and indicators upon the cover 20 of the control panel P includes a power switch 55, a light 56 to indicate when the power is on, a fuse socket 57, a switch 58 to operate a correct-answer light on the remote panel and a light 59 on the control panel to indicate when the switch 58 is on. Another light 60 on the control panel signals the end of the test or the end of a sequence of questions upon a card. In addition, there is provided a counter 61 to indicate the total number of questions. It was found preferable to provide a counter of a countdown type, which is manually set to a starting number, the total number of questions and finishing with zero; however, a countup type of counter may be used with the countdown unit if desirable. Both types are available from various sources of supply. Finally, the control panel P includes a correct answer counter 62 of a countup type.

The remote panel includes a power-on light 56' which burns whenever power is turned on as by switch 55, and a correct answer light 63. It includes further, four answer switches 64a, 64b, 64c and 64d respectively. In addition, the remote panel includes a question number indicator 65, a counter adapted to operate in unison with the countdown counter 61 although it is of the countup type.

Figure 7:
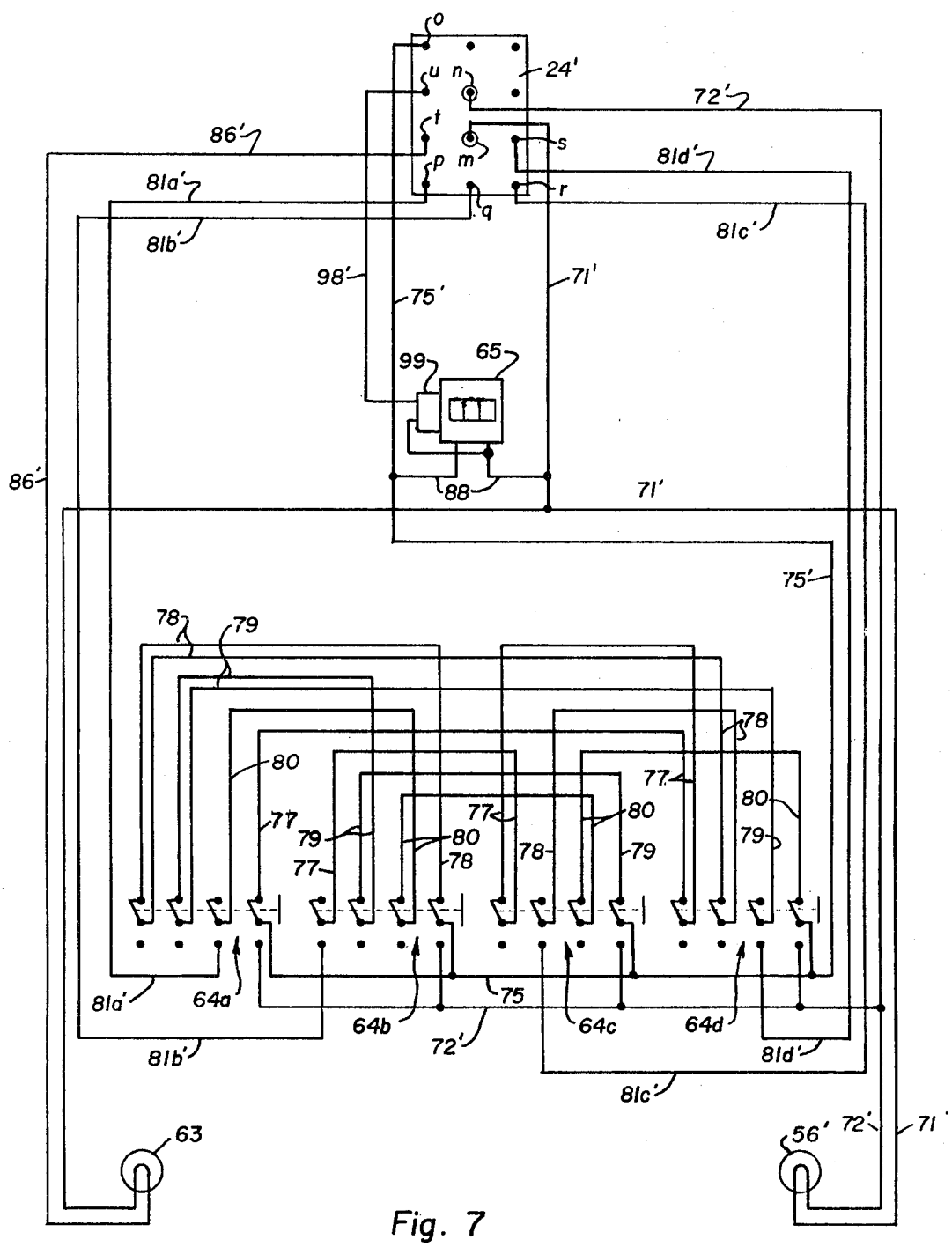
FIG. 7 is a circuit diagram of the circuits and components within the remote panel of FIG. 2.

The operation of these several controls is best described in connection with their circuits within the apparatus, as illustrated at FIGS. 6 and 7. The circuits are preferably operated with a common 110-volt A.C. power source, but may be easily modified to operate with other power sources. The power source lead 27 connects with a plug 70 in the control panel, from which power leads 71 and 72 extend. The "on" switch 55 and the fuse 57 are in one of these power leads and the indicator light 56 shunts these leads to turn on whenever switch 55 closes. These leads 71 and 72 extend through the interconnecting cable C which is preferably a 12-wire cable unit with each plug 25 fitting into a 12-prong socket 24 and 24' indicated thus at FIGS. 6 and 7. Accordingly, the power lead 71 extends to a prong m of socket 24 at FIG. 6 and continues from prong m as lead 71' at the remote panel P. The power lead 72 extends through a pair of normally closed series-connected switches 73 and 74, hereinafter described, and thence to a prong n of socket 24 at FIG. 6 and continuing from prong n as lead 72' in the remote panel at FIG. 7. These leads 71' and 72' extend directly to the power-on light 56' in the panel R.

Referring now to the circuits in the remote panel R, each answer switch 64a, 64b, 64c and 64d is a four-pole, double-throw switch and in their normal position, as illustrated at FIG. 7, all four poles of each switch are at the "off" contacts. Each switch is wired into the others in an arrangement which prevents manipulation by a student attempting to cheat by opening more than one switch simultaneously. One pole of each switch connects with a lead 75' which, in turn, extends to prong o of socket 24', to continue thence from prong o of socket 24, FIG. 6, as lead 75 to a stepper relay 76 and thence to power lead 72. The other three poles and the four "off" contacts of each switch are used to interconnect four cutout circuits 77, 78, 79 and 80, in series with each switch, each commencing at the switch having a lead 75 at one contact and terminating at an open "off" contact of another switch.

Only two "on" contacts of each switch is used, the contact whose pole connects with lead 75' and the contact opposite the open "off" contact above mentioned. The latter mentioned contact of each switch connects with extension leads 81a', 81b', 81c' and 81d', which extend to prongs p, q, r and s of socket 24' and thence to circuits in the control panel as hereinafter described. Each switch contact whose pole connects with lead 75, connects with the power lead 72'. Accordingly, whenever a switch is shifted from its "off" contacts to its "on" contacts, the power lead 72' will first connect with the lead 75' to energize the stepper relay 76. At the same time, the other contact will connect with the proper extension lead 81a' or 81b' or 81c' or 81d'. Then the circuit connecting the power lead 72', through proper lead 75' and to the lead 81', will be through one of the cutout circuits, 77–80, between the "off" contacts of the three unopened switches. For example, if switch 64a were shifted to its "on" contact, the circuit would be through power lead 72', to lead 75 through switch 64a, thence to lead of cutout circuit 80 at switch 64d, which extends through the "off" contacts of switches 64c and 64b, thence to lead 81a' and to the socket prong p. It is to be noted that switches 64b, 64c and 76d must be closed to energize the circuit 81a'.

Accordingly, one of the leads 81a', 81b', 81c' and 81d' is energized when the student closes a switch 64a, 64b, 64c or 64d respectively to indicate his choice of an answer to a question. Each lead 81a, 81b, 81c and 81d extends to one of the elongated bus bars 52 and through rods 48, and the circuit contacts are extended to the 20 columns of bus bars 33. However, the card K prevents contact of the rods 48 with the bus bars 33, except through the holes 53 in the card K as heretofore described.

Each bus bar is connected by its lead 32 to a contact 82 of stepper switch 83 whose arm 84 connects with a circuit 85, which extends to the correct answer counter 62 and thence to the power lead 71 to complete the circuit. Accordingly, the leads from only one bus bar at a time is circuited through the stepper. If the student presses a selected switch 64a (or 64b, 64c or 64d) which indicates the correct answer to a question, the circuit is completed through the contact of the head 49 in the hole 53 of the card K and then the correct answer counter 62 advances one unit. If he gives a wrong answer, the circuit remains open and the counter 62 does not advance. However, the stepper arm advances to the next stepper 82, connected by lead 32 to the next-in-sequence bus bar.

A lead 86 shunts lead 85 to extend to prong t of the socket 24. The lead continues from prong t' of socket 24' of the remote panel, as lead 86', and to the correct answer light 63 of that panel. The normally open manual switch 58 on the control panel is in lead 86 and is closed to permit the light 63 to operate. Thus the monitor can determine whether or not a student may be appraised of his answering a question correctly. The switch 58 is a single-throw, double-pole type and the other arm of the switch is in a lead 87 shunting the power leads 71 and 72 and carrying the light indicator 59 on the control panel.

As heretofore mentioned, the lead 75 extends to the stepper relay 76 and steps arm 84 each time a switch 64 closes lead 75 with power lead 72. The question number indicating counter 65 on the remote panel is connected to lead 75 by a lead 88 which extends to power lead 71' and the counter 61 on the control panel is connected to lead 75 by a lead 89 which extends to power lead 71 to complete that circuit.

The end of the questions on a card, or any designated end-of-test of a portion of a card as set by the counter, is operative to shut off the apparatus. The stepper relay 83 is conventionally fitted with a mechanical cam 90 which can be used to momentarily close a switch 91 at the end of the question sequence. This switch is in a circuit 92 which includes a latch 93 having a mechanical actuator 94 to open the normally closed switch 73 in the power lead 72, thus shutting off the remote panel circuits. This switch 73 is a single-pole, double-throw type and the other contact of the switch 73 is in a lead 95 extending to power lead 71 and having the end-of-test light 60. This light, when lit, tells the monitor that the apparatus is ready to receive another card or ready for another test.

The countdown counter 61 may be manually set to indicate a completed test for a question number which is not at the end of the stepper sequence, and it may be set to a number which will encompass several 20-question cards. The counter 61 includes a mechanical actuator 96 which will open the normally closed switch 74. This switch 74 is also a single-pole, double-throw type and the other contact connects with the lead 95 to light the end-of-test light 60 as heretofore described.

The actuator 96 may also be adapted to close a switch 97 in a reset lead 98 connecting with power lead 72 and extending to prong u of the socket 24, to extend as lead 98' from prong u of socket 24' of the remote panel to a counter reset 99 of counter 62' and thence through one side of lead 88 to lead 71' to complete the circuit and set that counter 65 to zero at the end of a test.

The resetting of the apparatus for a subsequent test is accomplished by pulling lever 40. This moves the contacts 49 away from the card K to permit the card to be replaced if necessary. The two normally open microswitches 43 and 44 are operated by movement of the lever 40, as best shown at FIG. 5, and are closed when lever 40 is pulled. One switch 43 is in a lead 100 connecting with the reset relay 101 of the stepper which returns the arm 84 to its initial first question contact whenever it is energized.

The other switch 44 is in a lead 102 which extends to latch 93 in opposition with lead 92 so that whenever the switch 44 is closed by movement of the lever 40, the latch 93 is energized to reset switch 73 to its initial position, closing lead 72.

It is obvious from the aforegoing description that the apparatus herein described may be modified to include within it other variations not shown. For example, a stop watch could be placed at the control panel P to be started manually by the operator and to be stopped by an electrical pulse or by actuator 96 at the end of a test. It is also to be noted that the test and test cards prepared for the apparatus could be of a type which could include more than one correct answer to a given question by the simple expedient of providing additional holes 53 in the test card K to permit two or more circuits to contact through the card. Other variations will also be apparent to those skilled in the art of constructing such equipment which will also be encompassed by and within the scope of the invention.

I claim:

1. A testing apparatus for a student to totalize a sequence of multiple choice-answer questions and to simultaneously tally the number of questions answered correctly, with the questions each having the same number of answer choices, said apparatus comprising:
   a. a remote panel having a plurality of normally off answer switches, the same as the number of answer choices of each question, whereby a question is answered by shifting a selected switch to an on position;
   b. a control panel having a totalizer means to record the total number of questions asked and a correct-answer tally means to record the total number of questions answered correctly;
   c. an answer lead from each switch at the remote panel to the control panel and power lead to energize the answer lead of a switch whenever the switch is shifted from its off to its on position;
   d. a means adapted to actuate the totalizer means whenever one of the answer leads is energized;
   e. a selector means at the control panel including: a sequence lead for each question of the aforesaid sequence oriented transversely to the answer leads, a punch card means between the sequence leads and the answer leads having openings to interconnect each sequence lead with a selected answer lead which represents the correct answer to the question associated with the specified sequence lead and a stepper means shiftable responsive to actuation of the totalizer means to interconnect each sequence lead sequentially with the aforesaid tally means to energize the tally means each time a question is answered correctly; and f. a circuit array means interconnecting the answer switches at the remote panel adapted to disable the answer leads from the other switches whenever one of the switches is shifted from its off to its on position, whereby to limit the student to the selection of one answer only and to immediately set the machine for answering the next subsequent question as soon as he shifts a switch.

2. In the testing apparatus defined in claim 1, wherein:

each answer switch has a plurality of poles forming double-throw switch arms, the same as the number of answer switches, with the pole arms being at one array of off contacts at one side of the throw when the switch is on and at the opposite array of contacts when the switch is off; and wherein each answer lead includes a portion which extends in series from the pole of its switch to the poles and the off-contacts of the other switches and thence to the said power lead, whereby the shifting of the poles of one answer switch energizes the answer lead of that switch, but opens the answer leads of the other circuits to render them inoperative.

3. In the testing apparatus defined in claim 2, wherein said connecting means includes a carrier having a fixed section and a movable section adapted to move against the fixed section;

said plurality of answer switch leads comprise elongated bus bars extending across one of the sections in a plane transverse to the movement between the sections; and each said question switch lead terminates as a plurality of contact heads opposing each of the respective bus bars, with the contact heads of all of the question leads being adapted to move towards contact with the respective bus bars whenever the two sections are moved together; and said punch card means interposed between the two sections permitting only a selected contact head of each question lead to contact a bus bar.

4. In the testing apparatus defined in claim 3, including a lever adapted to move the two sections together and apart;

a reset relay in the stepper means adapted to reset the arm to its initial position; a circuit including the reset relay and a normally open switch, said switch being adapted to be closed responsive to shifting of the lever to separate the sections.

5. In the apparatus defined in claim 2, wherein said totalizer counter includes a means adapted to throw a switch;

a circuit lead connecting with the aforesaid switch and extended to the remote panel;

a totalizer counter having a reset means at the remote panel adapted to operate in unison with said totalizer at the control panel; and wherein said circuit lead connects with the counter reset means and when energized by closing of said switch, will reset the totalizer counter to its beginning position.

6. In the apparatus set forth in claim 2, including an indicator means at the remote panel and a lead extending from the aforesaid correct answer tally lead, adapted to actuate the indicator whenever the correct-answer counter lead is energized, whereby to indicate a correct answer at the remote panel.

7. In the apparatus set forth in claim 2, wherein said totalizer counter includes a means adapted to throw a switch and a lead at the control panel having a visual means associated therewith and with the indicator switch adapted to be thrown whenever the totalizer counter counts the total number of questions in the examination to close said lead and actuate the visual indicator therein.